(12) United States Patent
Yuan

(10) Patent No.: US 11,265,306 B2
(45) Date of Patent: Mar. 1, 2022

(54) ACCOUNT AUTHENTICATION METHOD FOR CLOUD STORAGE, AND SERVER

(71) Applicant: TENCENT TECHNOLOGY (SHENZHEN) COMPANY LTD, Shenzhen (CN)

(72) Inventor: Zhe Yuan, Shenzhen (CN)

(73) Assignee: TENCENT TECHNOLOGY (SHENZHEN) COMPANY LTD, Shenzhen (CN)

(*) Notice: Subject to any disclaimer, the term of this patent is extended or adjusted under 35 U.S.C. 154(b) by 276 days.

(21) Appl. No.: 16/587,291

(22) Filed: Sep. 30, 2019

(65) Prior Publication Data

US 2020/0028838 A1    Jan. 23, 2020

Related U.S. Application Data

(63) Continuation of application No. PCT/CN2018/105410, filed on Sep. 13, 2018.

(30) Foreign Application Priority Data

Sep. 14, 2017   (CN) .......................... 201710827366.X

(51) Int. Cl.
*H04L 29/06* (2006.01)
*H04L 41/0803* (2022.01)
(Continued)

(52) U.S. Cl.
CPC .......... *H04L 63/08* (2013.01); *H04L 41/0803* (2013.01); *H04L 63/10* (2013.01);
(Continued)

(58) Field of Classification Search
None
See application file for complete search history.

(56) References Cited

U.S. PATENT DOCUMENTS 8,613,070 B1    12/2013    Borzycki et al.
2004/0054893 A1 *   3/2004    Ellis ...................... G06F 21/604
                                                    713/165
(Continued)

FOREIGN PATENT DOCUMENTS

CN    103297835 A    9/2013
CN    104219326 A    12/2014
(Continued)

OTHER PUBLICATIONS

Communication dated Oct. 23, 2020 from the State Intellectual Property Office of the P.R.C. in Application No. 201710827366.X.
(Continued)

*Primary Examiner* — Piotr Poltorak
(74) *Attorney, Agent, or Firm* — Sughrue Mion, PLLC

(57) ABSTRACT

A method of authenticating an account is provided. A resource access request requesting for accessing, by a first account, a target resource in a cloud storage system is received by a server from a first client, the first account logging in to the first client. In response to the resource access request, a first access right of the first account is determined by the server based on right configuration information corresponding to the target resource, the right configuration information indicating an association relationship between an account and an access right of the account to the target resource. The first account is allowed by the server to access the target resource through the first client based on the first access right indicating that the first account is allowed to access the target resource.

19 Claims, 9 Drawing Sheets

(51) Int. Cl.
    *H04L 67/1097* (2022.01)
    *H04L 67/303* (2022.01)
    *H04L 67/01* (2022.01)
(52) U.S. Cl.
    CPC ........ *H04L 67/1097* (2013.01); *H04L 67/303* (2013.01); *H04L 67/42* (2013.01)

(56) References Cited

U.S. PATENT DOCUMENTS

2006/0117010 A1*  6/2006  Hakala .................. G06F 16/176
2013/0282852 A1* 10/2013  Chu ........................ H04W 4/06
                                                             709/213

FOREIGN PATENT DOCUMENTS

| CN | 104504343 A | 4/2015 | |
|---|---|---|---|
| CN | 105072135 A | 11/2015 | |
| CN | 105429999 A | 3/2016 | |
| CN | 105490913 A | 4/2016 | |
| CN | 106936772 A | 7/2017 | |
| WO | WO-2015103972 A1 * | 7/2015 | ......... H04L 63/0815 |

OTHER PUBLICATIONS

Written Opinion of the International Searching Authority dated Nov. 28, 2018 in International Application No. PCT/CN2018/105410.
International Search Report for PCT/CN2018/105410 dated Nov. 28, 2018 [PCT/ISA/210].

* cited by examiner

ACCOUNT AUTHENTICATION METHOD FOR CLOUD STORAGE, AND SERVER

CROSS-REFERENCE TO RELATED APPLICATION(S)

This application is a continuation application of International Application No. PCT/CN2018/105410, filed on Sep. 13, 2018, which claims priority to Chinese Patent Application No. 201710827366.X, entitled "ACCOUNT AUTHENTICATION METHOD OF CLOUD STORAGE AND SERVER" filed with the Chinese Patent Office on Sep. 14, 2017, the disclosures of which are herein incorporated by reference in their entireties.

BACKGROUND

1. Field

The disclosure relates to the field of the Internet, and specifically, to an account authentication method of a cloud storage and a server.

2. Description of the Related Art

A cloud service is an addition, use, and delivery mode of a relevant service based on the Internet, and usually relates to providing a resource that is dynamically and easily extensible through the Internet and that is usually virtualized. Cloud is a metaphor of a network or the Internet. The cloud service enables obtaining a relevant service according to requirements in an easily extensible manner. Such a service may be related to the IT, software, and the Internet, or may be another service. It means that a computing capacity can also be circulated as a commodity over the Internet.

Currently, cloud storage resources of the cloud service include two types: a storage bucket and an object. By default, cloud storage resources are private, only resource owners can access resources, and the resource owners correspond to accounts that create the resources. To help another user to access a private cloud storage resource of a resource owner, the resource owner may deliver an access right for the private resource of the resource owner to the user. When a visitor attempts to access the private resource of the resource owner, to ensure security of the resource and an access behavior, authentication needs to be performed on the visitor.

However, in the related art technology, since a cloud storage service provides a plurality of services with unassociated authentication policies and has poor policy verifiability, to evaluate whether an access operation should take effect (that is, authentication is successful) and why the access operation should take effect, it is necessary to combine different scenarios and different policies in services with a plurality of authentication policies to perform unified analysis, which consumes a long time, and consequently, efficiency of authentication is affected.

No effective solution has been provided to solve the technical problem in the related art technology that efficiency of authentication on a visitor is low when the visitor accesses a cloud resource.

SUMMARY

One or more example embodiments provide an account authentication method of a cloud storage and a server, to at least solve a technical problem that efficiency of authentication on a visitor who accesses a cloud resource is low in the related art technology.

According to an aspect of an example embodiment, provided is a method of authenticating an account is provided. A resource access request requesting for accessing, by a first account, a target resource in a cloud storage system is received by a server from a first client, the first account logging in to the first client. In response to the resource access request, a first access right of the first account is determined by the server based on right configuration information corresponding to the target resource, the right configuration information indicating an association relationship between an account and an access right of the account to the target resource. The first account is allowed by the server to access the target resource through the first client based on the first access right indicating that the first account is allowed to access the target resource.

According to an aspect of another example embodiment, provided is a server for authenticating an account, the server including: at least one memory operable to store program code; and at least one processor operable to read the program code and operate as instructed by the program code, the program code including: receiving code configured to cause at least one of the at least one processor to receive, from a first client, a resource access request requesting for accessing, by a first account, a target resource in a cloud storage system, the first account logging in to the first client; determining code configured to cause at least one of the at least one processor to determine, in response to the resource access request, a first access right of the first account based on right configuration information corresponding to the target resource, the right configuration information indicating an association relationship between an account and an access right of the account to the target resource; and allowing code configured to cause at least one of the at least one processor to allow the first account to access the target resource through the first client based on the first access right indicating that the first account is allowed to access the target resource.

According to an aspect of still another example embodiment, provided is a non-transitory storage medium, storing computer program, which, when executed by at least one processor, causes at least one of the at least one processor to perform a method of authenticating an account, the method: receiving, from a first client, a resource access request requesting for accessing, by a first account, a target resource in a cloud storage system, the first account logging in to the first client; determining, in response to the resource access request, a first access right of the first account based on right configuration information corresponding to the target resource, the right configuration information indicating an association relationship between an account and an access right of the account to the target resource; and allowing the first account to access the target resource through the first client based on the first access right indicating that the first account is allowed to access the target resource.

BRIEF DESCRIPTION OF THE DRAWINGS

Accompanying drawings described herein are used to provide further understanding about the disclosure, and constitute one portion of the disclosure. Schematic embodiments and their descriptions are used to explain the disclosure, and do not constitute an inappropriate limit on the disclosure.

DETAILED DESCRIPTION

Figure 1:
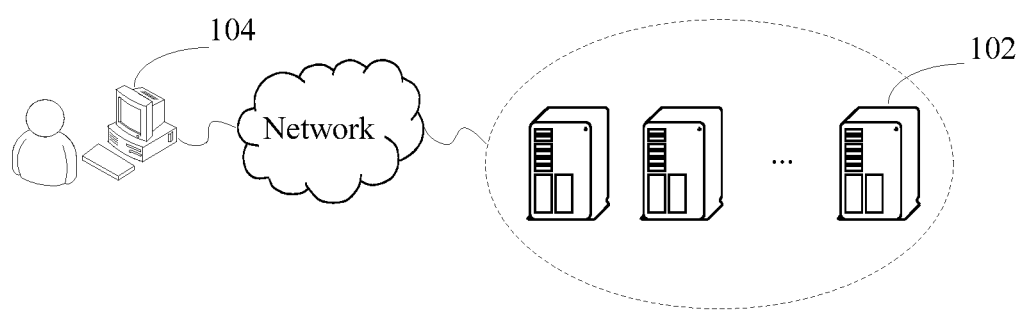
FIG. 1 is a schematic diagram of a hardware environment of an account authentication method of cloud storage according to an example embodiment.

To make a person skilled in the art understand the solutions of the disclosure better, the following clearly and completely describes the technical solutions in the example embodiments of the disclosure with reference to the accompanying drawings. Apparently, the described embodiments are merely some instead of all of the embodiments of the disclosure. All other embodiments obtained by a person of ordinary skill in the art based on the embodiments of the disclosure without creative efforts shall fall within the protection scope of the disclosure.

The terms "first", "second", and the like in the specification, the claims, and the foregoing accompanying drawings of the disclosure are merely used for distinguishing similar objects, and do not need to be used for describing a special sequence or order. It is to be understood that data used in this way can be interchanged in an appropriate case, so that the embodiments of the disclosure that are described herein can be implemented in a sequence other than those sequences illustrated or described herein. Moreover, the terms "include", "contain" and any other variants mean to cover the non-exclusive inclusion, for example, a process, method, system, product, or device that includes a list of operations or units is not necessarily limited to those units, but may include other units not expressly listed or inherent to such a process, method, system, product, or device.

In the disclosure, the term "at least one of" includes any and all combinations of one or more of the associated listed items. For example, the term "at least one of A and B" or "at least one of A or B" is only used to describe that three cases may exist: only A exists, both A and B exist, and only B exists. Similarly. "at least one of A, B, and C" or "at least one of A, B, or C" indicates that there may exist seven cases: only A exists, only B exists, only C exists, both A and B exist, both A and C exist, both C and B exist, and all A, B, and C exist.

In the following description, a term 'module,' 'unit,' or 'part' refers to an element that performs at least one function or operation. The 'module' or 'unit' may be realized as hardware, software, or combinations thereof. A plurality of 'modules,' 'units,' or 'parts' may be integrated into at least one module or chip and realized as at least one processor (not shown), except for a case where respective 'modules' or 'units' need to be realized as discrete specific hardware.

Terms used in the disclosure are selected as general terminologies currently widely used in consideration of the configuration and functions of the disclosure, but can be different depending on intention of those skilled in the art, a precedent, appearance of new technologies, and the like. Further, in specific cases, terms may be arbitrarily selected. In this case, the meaning of the terms will be described in the description of the corresponding embodiments. Accordingly, the terms used in the description should not necessarily be construed as simple names of the terms, but be defined based on meanings of the terms and overall contents of the disclosure. Some terminologies used in describing the example embodiments of the disclosure are discussed below.

Developer: A client who registers and uses a cloud computing product on a service platform of a cloud service provider.

Authorization: An access right that is granted by a cloud service client to a user to help the user to securely control an access right of the user to a resource of the user and that includes which users can access a resource, specific resources they can access, and a manner in which the resources are accessed.

Cloud application programming interface (API): some functions predefined by a cloud service provider to provide developers with a capability of accessing a set of routines based on specific software or hardware without accessing source code or understanding details of an internal working mechanism.

Cloud storage: a system integrating a large quantity of different types of storage devices in a network to work together through application software by using functions such as a cluster application, a network technology, or a distributed file system and jointly externally provide data storage and service access functions.

Access control list (ACL): an access control list, which is convenient for a client to manage a right of access to a storage bucket and an object.

The example embodiments of the disclosure provide an account authentication method of cloud storage.

Optionally, in an example embodiment, the foregoing account authentication method of cloud storage may be applied to a hardware environment including a server 102 and a terminal 104 as shown in FIG. 1. In an example embodiment in FIG. 1, the server 102 is connected to the terminal 104 through a network. The foregoing network includes, for example but is not limited to, a wide area network, a metropolitan area network, or a local area network. The terminal 104 includes, for example but is not limited to, a computer, a mobile phone, a tablet computer, or the like. The account authentication method of cloud storage in example embodiments of the disclosure may be performed by the server 102 or be performed by the server 102 and the terminal 104 together. The terminal 104 may alternatively perform the account authentication method of cloud storage in the example embodiments of the disclosure by using a client installed on the terminal 104.

When the account authentication method of cloud storage in the example embodiments is individually performed by the server, the server may only need to directly execute program code corresponding to the method of the disclosure on the server.

When the account authentication method of cloud storage of an example embodiment is performed together by a server and a terminal, the terminal initiates a resource access request, and in this case, the server performs program code corresponding to the method of this application, and in response to the resource access request, the server determines a first access right of a first account on the terminal according to right configuration information corresponding to the target resource, and feeds back an authentication result to the terminal.

Figure 2:
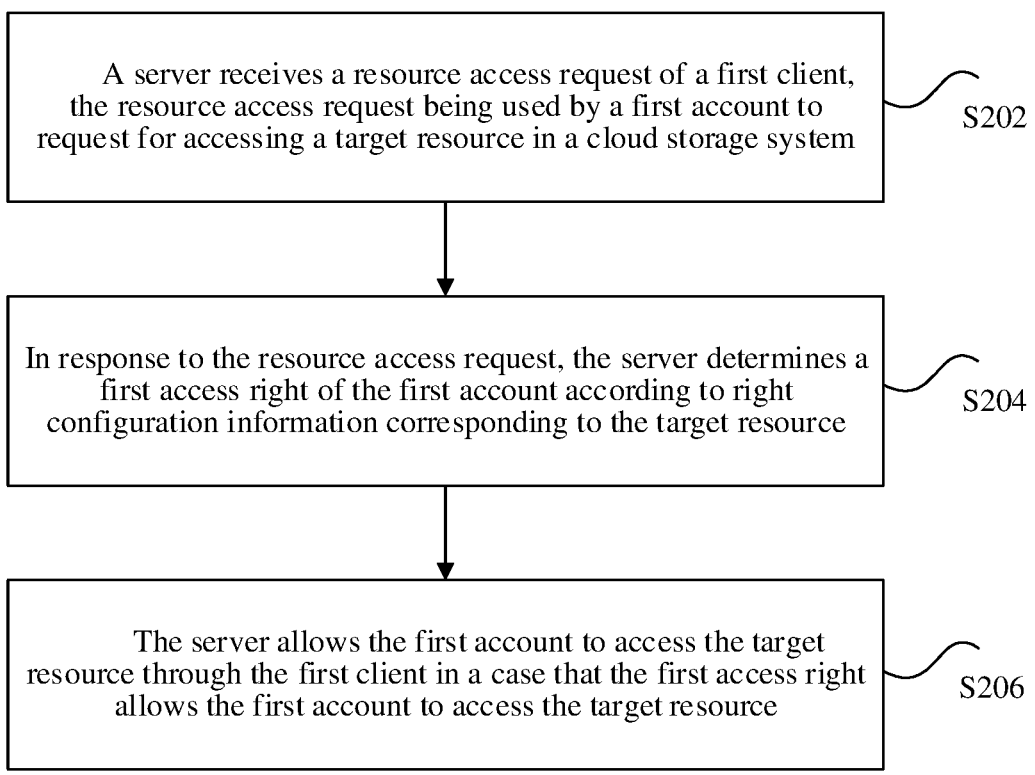
FIG. 2 is a flowchart of an optional account authentication method of cloud storage according to an example embodiment.

An example embodiment is described below in detail by using an example in which program code corresponding to the method according to an example embodiment is executed together by a server and a terminal. FIG. 2 is a flowchart of an optional account authentication method of cloud storage according to an example embodiment. As shown in FIG. 2, the method may include the following operations S202-S206.

Operation S202: A server receives a resource access request of a first client, the resource access request being used by a first account to request for accessing a target resource in a cloud storage system, and the first account logging in to the first client.

The first client is a client for accessing a cloud storage system, and includes, for example but is not limited to, a web client (such as a hypertext markup language 5 (HTML5) web page), and an application client (such as an installed third party application and a local application of a computer).

The target resource and a resource saved in the cloud storage system in a cloud storage manner include, for example but are not limited to, user data, documents, and application data. The resources may be saved in forms of a storage bucket and an object. The first account is not an account to which the target resource belongs, but is an account of a visitor accessing the target resource, and the resource access request is a request initiated by the first account when the first account requests for access to the target resource.

S204: In response to the resource access request, the server determines a first access right of the first account according to right configuration information corresponding to the target resource, the right configuration information indicating an association relationship between an account and an access right of the account to the target resource.

Optionally, an association relationship between a resource in the cloud storage system and an access right of an account is configured in the right configuration information, and the access right includes but not limited to, whether to allow access to the resource, and a type of an operation allowed (such as modification, viewing, and deletion).

In the cloud storage system, a piece of corresponding permission configuration information may be set for each resource, and when a visitor accesses a target resource, a first access right of a first account of the visitor may be determined according to the permission configuration information of the target resource. For example, the first access right of the first account of the visitor may be determined only according to the permission configuration information of the target resource. The first access right is used to indicate whether the first account is allowed to access the target resource. For example, if the first account is not configured in the right configuration information, or access of the first account is configured to be not allowed, the first access right is used to indicate that the first account is not allowed to access the target resource, and if access of the first account is configured to be allowed in the right configuration information, the first access right is used to indicate that the first account is allowed to access the target resource.

S206: The server allows the first account to access the target resource through the first client in a case that the first access right allows the first account to access the target resource, where in this case, the target resource may be pushed to the first client for representation.

After analyzing the related art technology, the applicant recognizes that management of resources in the related art technology includes the following three aspects:

(1) ACL-Based Resource Management (ACL Policy)

Each storage bucket and object has an associated ACL. The ACL is an authorization list that specifies an authorized person and a granted right. A management account can use the ACL to grant a basic read or write right to another account.

(2) Storage Bucket Policy

For a storage bucket, a management account may grant a right to a corresponding storage bucket and its object to another account or a sub-account through a policy of adding a storage bucket. Any object right shall be only applied to an object created by a storage bucket owner, and the storage bucket policy is a supplement or replacement for ACL-based resource management.

(3) User-Based Resource Management (User Policy)

A management account may control an access right to a storage resource by using a conventional cloud service authentication management method. The conventional art defines what user can access what resource by performing what operation from a perspective of a user.

Figure 3:
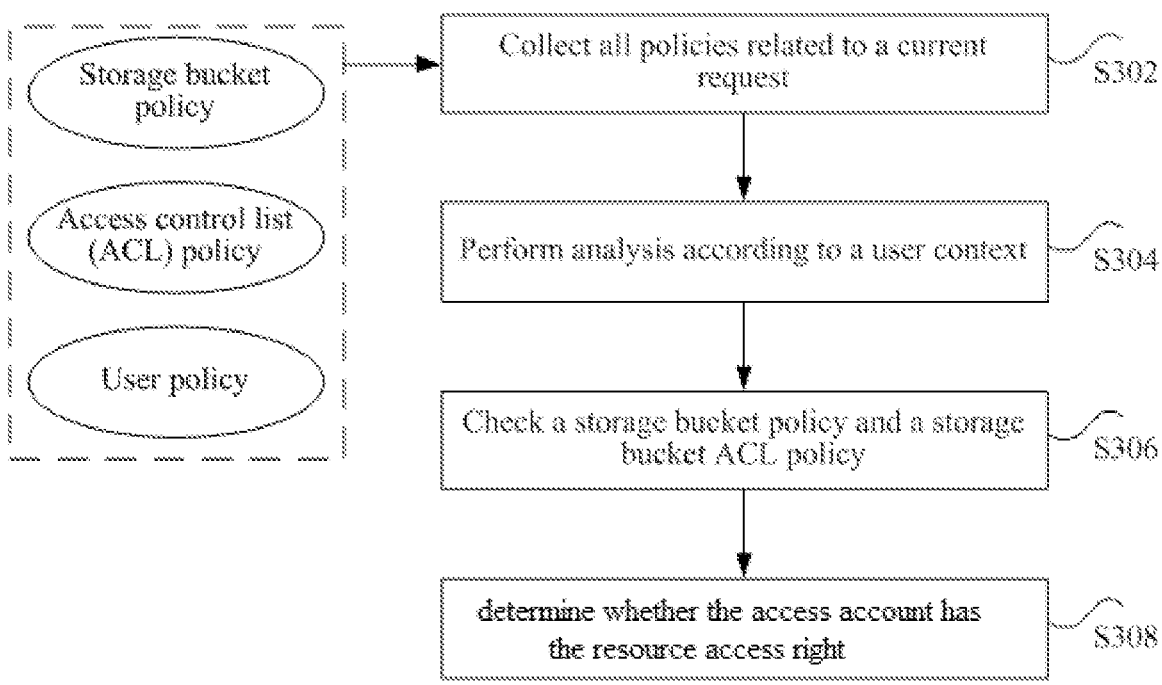
FIG. 3 is a flowchart of an optional account authentication method of cloud storage according to an example embodiment.

An authentication process based on the foregoing several types of policies is shown in FIG. 3, and includes operations S302-S308:

Operation S302: Collect all policies related to a current request, including the foregoing user-based resource management policy, ACL policy, and storage bucket policy.

Operation S304: Analyze, with reference to a user context, whether an access account is a sub-account, and in a case of resource access of a sub-account, analyze, according to the user context, whether a root account of sub-account has a resource access right.

Operation S306: In a case of access directed to an object or a storage bucket, check the storage bucket policy and a storage bucket ACL policy (that is, a storage bucket context) to determine whether to allow access of the access account (that is, whether a resource access right is possessed).

Operation S308: For access to the object, evaluate an object-based policy and an object ACL (that is, an object context) policy to determine whether the access account has the resource access right.

Compared with the related art technology, an overall setting scheme and an authentication scheme of the technical solution of the disclosure are simple and convenient, and have the following advantages:

(1) There are many portals for right management in the related art technology, including an authentication management system for a cloud service, a policy management system for a storage service, and ACL management. In an example embodiment of the disclosure, for resource granularity-based management, there is only one portal for right management (that is, a portal for configuring right configuration information).

(2) In the related art technology, an authentication procedure is complex, a user-based resource management policy, an ACL policy, and a storage bucket policy need to be comprehensively considered, and there are different execution paths in different context scenarios. In an example embodiment of the disclosure, only right configuration information needs to be considered, and an authentication procedure is simple and convenient.

(3) In the related art technology, policy verifiability is poor, and to evaluate whether an operation is effective or why an operation is effective, unified analysis needs to be performed with reference to various scenarios and various policies. However, in an example embodiment of the disclosure, policy verifiability is significantly improved for a cloud storage service that communicates various services involving an authentication policy, because the authentication policy can be verified by only using right configuration information.

In the foregoing operations S202 to S206, a resource access request of a first account is received; in response to the resource access request, a first access right of the first account is determined according to right configuration information corresponding to the target resource, an association relationship between an account accessing the target resource and an access right of the account being configured in the right configuration information; and the first account is allowed to access the target resource through the first client in a case that the first access right allows the first account to access the target resource. In the related art technology, there is a technical problem that efficiency of authentication on a visitor who accesses a cloud resource is relatively low. On the other hand, according to an example embodiment, during authentication on the first account, only the right configuration information that is set for the target resource needs to be considered without considering a plurality of authentication policies. Accordingly, an example embodiment can achieve a technical effect of improving efficiency of authentication on a visitor who accesses a cloud resource.

An example embodiment is described below in detail with reference to operations S202 to S206 shown in FIG. 2:

(1) With Regard to Right Management

Before performing operation S202 of receiving a resource access request of a first client, unified right management is performed in the following manner:

Specifically, the right configuration information may be set for the target resource according to indication of a right configuration instruction: in the right configuration information, the target resource is set to allow some access accounts (which may or may not include the first account) to perform access in an account crossing manner. In the right configuration information, the target resource is set to allow access of an anonymous account.

The setting of the target resource to allow the first account to perform access in an account crossing manner includes at least one of the following: setting the target resource to allow access of an access account in a case that the access account is a root account; setting the target resource to allow access of a root account of an access account in a case that the access account is a sub-account and the root account of the access account allows transferring an access right to the sub-account; and setting the target resource to allow access of an access account in a case that the access account is a sub-account.

After an access right to the target resource is authorized to a specific root account, the root account may configure a sub-account, and the configured sub-account may inherit the access right, and the root account may choose specific sub-accounts according to requirements.

Optionally, after unified setting is performed, the right configuration information may be entered through the same portal to access a specific access account, and the first account is used as an example for description:

receiving, by the server, a right configuration instruction of a second client before the receiving a resource access request of a first client (the right configuration instruction being used by the second account to configure the first access right of the first account for the target resource, the first access right including a right indicating whether to allow the first account to access the target resource and an operation type of a resource operation that the first account is allowed to perform on the target resource); obtaining, in response to the right configuration instruction, account information of an account to which the target resource belongs; and configuring the first access right (including, but not limited to, rights such as access, read and right, deletion, and modification) indicated by the right configuration instruction to the first account in a case that the second account matches the account information of the account to which the target resource belongs (that is, the same account, for example, account names and passwords are the same), and storing an association relationship between the first account allowed to access the target resource and the first access right into right configuration information of the target resource.

In an example embodiment, right setting may include three portals, namely, a unified cloud service policy management setting portal, a policy management portal for a cloud storage service, and a public/private read/write configuration option.

The unified cloud service policy management portal is not only a cloud storage service configuration portal, but also a policy management configuration portal for another cloud service. The policy management portal for a cloud storage service may provide a policy configuration portal for a user on the console, and finally, the policy is the same as that previous portal, and is also written into the right management system. A public/private read/write configuration portal is only configured for public/private read/write configuration of a single storage bucket or object.

The foregoing three portals may all be configured in the right configuration information, so as to communicate respective configuration portals. A right check is performed after right configuration is completed.

After the right configuration is completed, whether right configuration information is correct may be checked by using a unified right check tool for a cloud service. Upon completion, when accessing the target resource, a user may perform authentication on a user or an account by using right configuration information.

(2) Authentication Procedure

In the technical solution provided in operation S202, when a user logs in to a first client by using a first account, if the user wants to access a target resource in a cloud storage system, the user may initiate, through the first client (e.g., terminal), a resource access request to a server, and the server receives the resource access request of the first client, and initiates authentication of the first account.

In the technical solution provided in operation S204, in response to the resource access request, the server determines a first access right of the first account according to right configuration information corresponding to the target resource, an association relationship between an account accessing the target resource and an access right of the account being configured in the right configuration information.

Specifically, the determining a first access right of the first account according to right configuration information corresponding to the target resource includes: obtaining, by the server, an account type of the first account and the right configuration information that is set for the target resource in a plurality of pieces of information; and searching, by the server, the right configuration information for the first access right according to the account type of the first account.

Optionally, a piece of corresponding permission configuration information may be set for each resource, and for a resource in a cloud storage system, there is usually a plurality of piece of right configuration information (e.g., the foregoing plurality of pieces of information), including right configuration information that is set for the target resource, and the right configuration information may be marked with a resource identifier of the target resource.

For any access account (including the first account), its right is mainly determined from two prospective, one is from the account itself, and the other is an anonymous account (which is also an anonymous account in any cloud storage system).

Optionally, the searching, by the server, the right configuration information for the first access right according to the account type of the first account includes at least one of the following: (i) searching, by the server, the right configuration information for the first access right corresponding to an account identifier of the first account in a case that the account type of the first account is a root account; (ii) searching, by the server, the right configuration information for an access right corresponding to an account identifier of a root account of the first account as the first access right in a case that the account type of the first account is a sub-account and the root account of the first account allows transferring the access right to the sub-account; and (iii) searching, by the server, the right configuration information for the first access right corresponding to an account identifier of the first account in a case that the account type of the first account is a sub-account.

Optionally, the searching, by the server, the right configuration information for the first access right according to the account type of the first account includes: setting, by the server in a case that the account type of the first account is an anonymous account, an access right that is set for the anonymous account in the right configuration information as the first access right.

In the technical solution provided by operation S206, the first account is allowed to access the target resource through the first client in a case that the first access right allows the first account to access the target resource.

Optionally, if the first access right indicates that the first account is not allowed to access the target resource, prompt information is generated to prompt that the user does not have the access right to the target resource, and an application interface for applying for an access right to the target resource is provided. Through the interface, the first account may initiate an access request to an account to which the target resource belongs, and the account to which the target resource belongs re-configures the right configuration information of the target resource.

Optionally, after the account to which the target resource belongs re-configures the right configuration information of the target resource, the first account is notified that the first account already has the access right to the target resource.

In an example embodiment, after the first account is allowed to access the target resource through first client, a target resource may be displayed on the first client, and if the server detects a resource operation of the first account on the target resource, the resource operation is performed on the target resource in a case that an operation type of the resource operation is a target type, the target type being a type of an operation that the first account is allowed by the first access right to perform.

For example, the first access right configured by the right configuration information for the first account allows a modification operation on the target resource and does not allow a deletion operation. If an operation type of a received resource operation of the first account is a deletion operation, the operation is not performed, and the first account is prompted that the first account does not have a right of the operation. If an operation type of a received resource operation of the first account is a modification operation, the operation is performed, and the first account is prompted that the operation is successfully performed.

As an optional embodiment, an example embodiment is further described below in detail with reference to a specific implementation.

Figure 4:
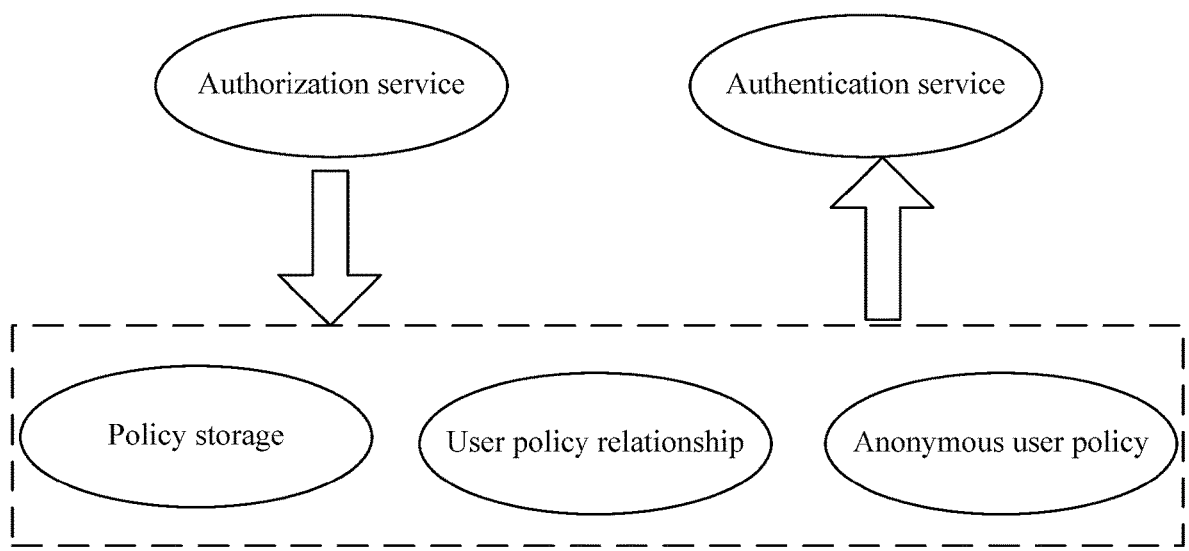
FIG. 4 is a schematic diagram of an optional cloud service authentication solution according to an example embodiment.

As shown in FIG. 4, a unified cloud service authentication solution of the disclosure includes several parts, namely, a common authorization procedure (corresponding to an authorization service), a right transfer authorization procedure (corresponding to policy storage and a user policy relationship), an anonymous user authorization procedure (corresponding to an anonymous user policy), and an unified authentication procedure (corresponding to an authentication service).

In the common authorization procedure, a common cloud service authorization procedure is completed, and provides a basis of the cloud service authentication solution. In the right transfer authorization procedure, secondary authorization of a granted right of a root account is performed by the root account to a sub-account. The anonymous user authorization procedure is responsible for setting a public read write right, and the authentication procedure is responsible for real-time authentication of the cloud service.

Basic data related to the access policy includes policy data (corresponding to the policy storage), user policy relationship data (corresponding to the user policy relationship), and relatively independent anonymous user policy data (corresponding to the anonymous user policy). Some pieces of policy information of a non-anonymous user are stored in the policy data, and a policy includes information such as an authorized cloud API operation, an operation resource, and an operation condition. In the user policy relationship, an authorized user and a user relationship of right transfer are recorded, and the anonymous user policy is a storage service specifically customized for the public read/write policy.

Figure 5:
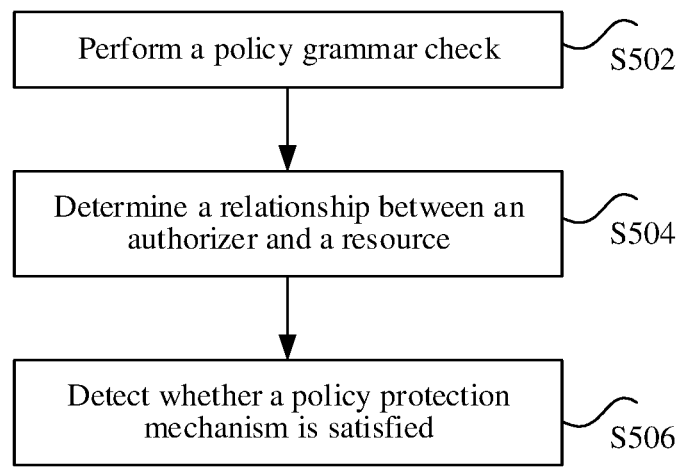
FIG. 5 is a flowchart of an optional account authentication method of cloud storage according to an example embodiment.

As shown in FIG. 5, the common authorization procedure is described as follows:

Operation S502: Perform a policy grammar check, where the policy grammar describes details of authorization, including what person (or account) has an access right of what operation (such as read, write, deletion, and modification) of what resource, the grammar check includes a grammar format correctness check and a service support feature check, and some services do not support some differentiated features, for example, do not support account-crossing access.

Operation S504: Determine a relationship between an authorizer and a resource, where by default, only an owner of a resource can authorize another user (or another account) to use the resource, and one who is not the owner of the resource is not allowed to perform authorization.

Operation S506: Detect whether a policy protection mechanism is satisfied, where for a single user, a quantity of resources that can be authorized and a quantity of resources that are authorized both have upper limits.

The authority transfer authorization procedure is a procedure implemented for differentiated requirements for cloud storage authentication. Authorization of the cloud storage is often account-crossing authorization. Although authorization to a sub-account of another account is also supported, the authorizer needs to clarify a sub-account list of the other account, so as to perform authorization. In this way, authorization costs of the authorizer are increased. An optional manner is authorizing a right to another root account in an account-crossing manner, and then, granting, by the other root account, the right to a sub-account.

When the root account grants a right to the sub-account, if it is found that an owner of a resource associated with the right is not the authorizer, it is necessary to verify whether the authorizer has an access right to the granted resource, and if so, the right can also be granted to a sub-account thereof, but account-crossing authorization is not allowed any more.

The anonymous user authorization procedure is a procedure that needs to be executed when there are a public read/write operation and a private read/write operation for the storage bucket and the object. At this time, an authorized object does not mean a specific root account or sub-account, but a super user set, including user sets of all cloud service providers. In this case, a virtual anonymous user is separately defined, and the virtual user exists as an authorized object in the anonymous user authorization procedure. During authentication, all user accounts are considered to have an identity of an anonymous user by default, and the identity may be authenticated.

The authentication procedure may include two parts: common identity evaluation logic and anonymous identity evaluation logic. For example, a visitor may include two identities, one is an identity (e.g., a root account and a sub-account) in an account system of the visitor, and the other is an anonymous user identity. During assessment of authentication, whether the common identity is authenticated is evaluated, and if the authentication fails, whether the anonymous identity is authenticated is evaluated.

Figure 6:
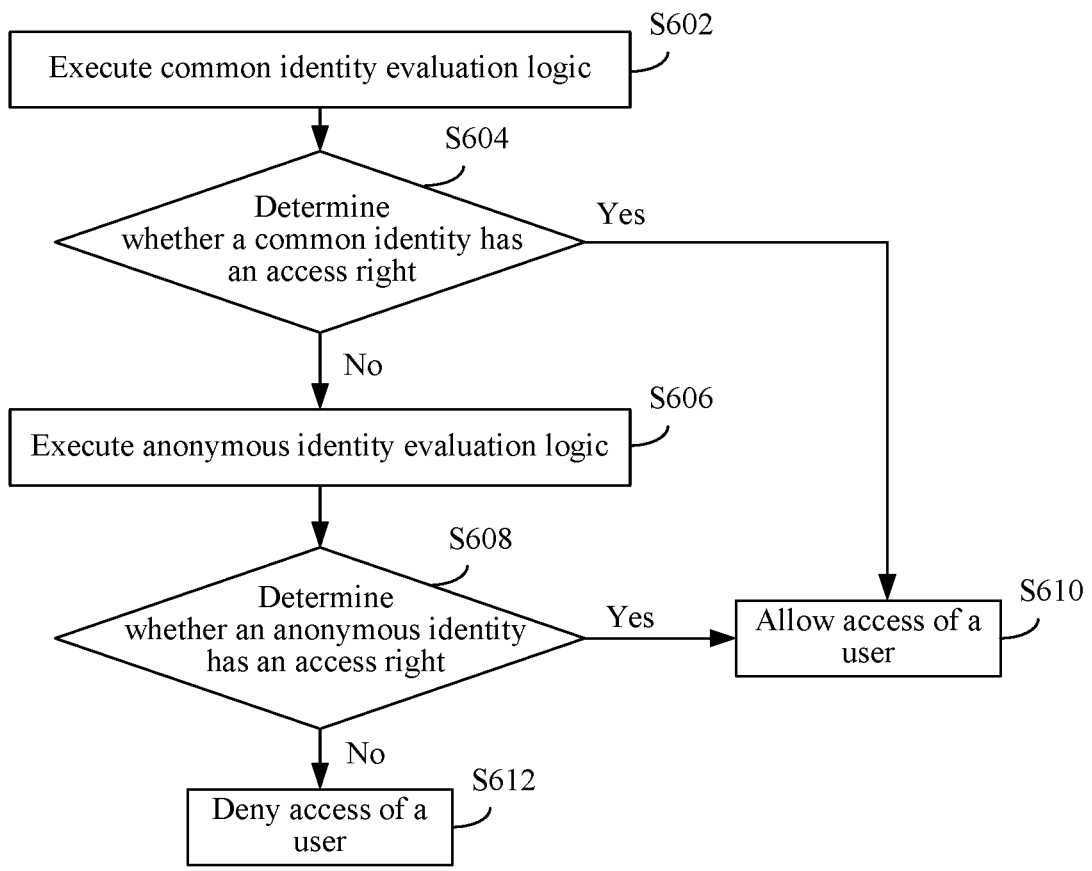
FIG. 6 is a flowchart of an optional account authentication method of cloud storage according to an example embodiment.

FIG. 6 is a flowchart of an optional account authentication method of cloud storage according to an example embodiment. As shown in FIG. 6, operations S602-S612 may be performed:

Operation S602: Execute common identity evaluation logic.

That is, whether a first account has an access right is determined, and whether a root account of the first account has the access right is determined. Details of example determining methods are described above.

The common identity of the visitor is an identity of the visitor in an account system of the visitor. The common identity can be represented by a root account and a sub-account. If the sub-account has an access right to the target resource, the root account thereof necessarily has an access right to the target resource. Therefore, when the common identity evaluation logic is executed, it only needs to evaluate whether the root account thereof has the access right, to determine whether the common identity of the visitor has the access right.

If the account provided by the visitor for executing the common identity evaluation logic is a sub-account of the visitor, whether a root account of the visitor has an access right may be analyzed according to a user context of the visitor.

Operation S604: Determine whether a common identity has an access right according to an execution result, and if yes, perform operation S610; otherwise, perform operation S606.

For example, if the root account of the first account does not have an access right to the target resource, the sub-account certainly does not have the access right to the target resource. Therefore, whether a common identity has the access right may be determined according to an execution result of executing evaluation logic on the root account.

Operation S606: Execute anonymous identity evaluation logic.

That is, whether the target resource is set to run access of an anonymous user or an anonymous account is determined.

If the root account of the first account does not have an access right to the target resource, the access right of the anonymous identity of the first account may be evaluated.

Operation S608: Determine whether an anonymous identity has an access right according to an execution result, and if yes, perform operation S610; and otherwise perform operation S612.

Operation S610: Allow access of a user.

The visitor can be allowed to access the resource requested by the visitor provided that either of the common identity and the anonymous identity of the visitor has the access right, so that a success rate of the visitor accessing the resource is improved.

Operation S612: Deny access of a user.

If neither of the common identity and the anonymous identity of the visitor has an access right to the resource, access of the visitor is denied, so that security of resource access is improved.

Figure 7:
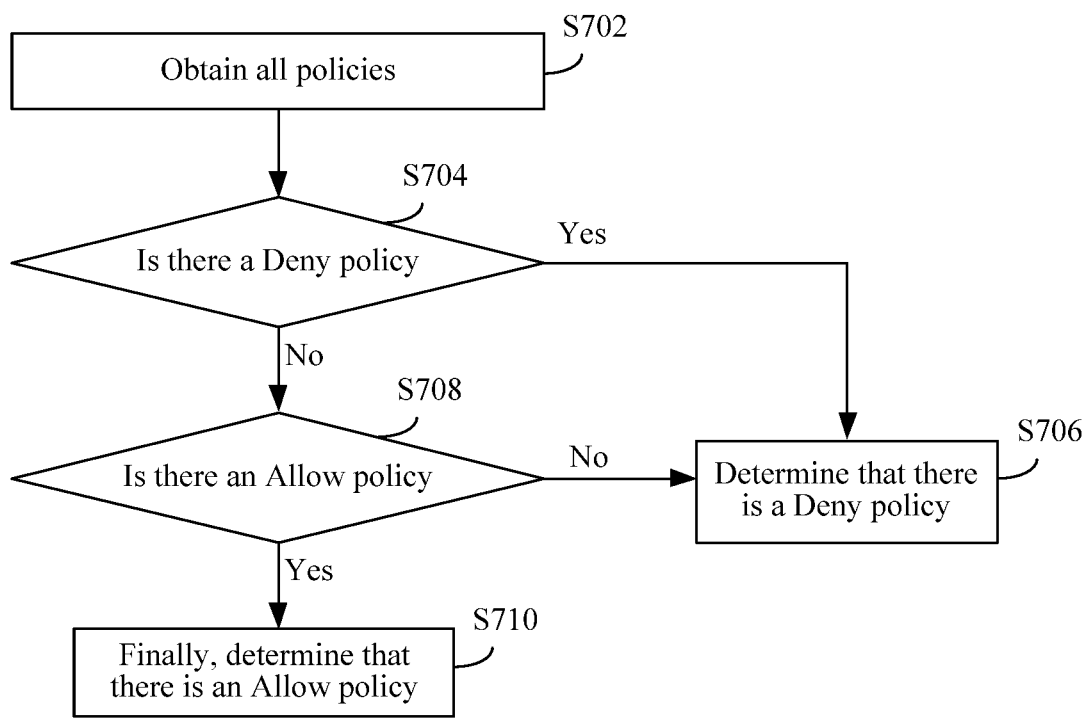
FIG. 7 is a flowchart of an optional account authentication method of cloud storage according to an example embodiment.

FIG. 7 is a flowchart of an optional account authentication method of cloud storage according to an example embodiment. Evaluation logic of a single resource is described as shown in FIG. 7, including operations S702 to S710.

By default, both a resource and an operation are unauthorized policies (that is, a Deny policy), except for a root account to which a resource belongs.

Operation S702: Obtain all policies associated with a current account (or a first account), all the policies including: a user-based resource management policy, an ACL policy, a storage bucket policy, and the like.

Operation S704: Determine whether there is a Deny policy in all the policies, and if yes, perform operation S706; otherwise, perform operation S708.

Operation S706: Finally, determine that there is a Deny policy, and explicitly forbid the operation and the associated resource through the Deny policy. First, a policy of a user is determined, a policy of an operation requested by the user and a policy of an associated resource are determined as a Deny policy provided that there is an unauthorized policy (that is, a Deny policy) in all the policies associated with the current user, and performing the operation on the associated resource is explicitly forbidden.

For example, a manner in which the operation and the associated resource are explicitly forbidden by the Deny policy may be, but is not limited to, indicating which operations and associated resources are denied access by using a dialog box popped up on a display interface.

Operation S708: Determine whether there are a resource and an operation that are both authorized policies (that is, an Allow policy), and if yes, perform operation S710; otherwise perform operation S706.

Operation S710: Finally determine that there is an Allow policy, and authorize the operation and the associated resource based on the Allow policy. For example, states of an operation and an associated resource, which are Deny by default, are amended as an Allow state, and a user is allowed to perform the operation on the associated resource.

If both the resource and operation of the user are authorized policies (that is, the Allow policy), the policy is finally determined as the Allow policy. The policy is determined as a Deny policy and the operation on the associated resource is explicitly forbidden provided that either of the resource and the operation is an authorized policy (that is, the Deny policy).

In the solution provided by an example embodiment, based on the cloud service unified authentication solution in the related art technology (that is, based on a resource management policy of a user, what user has an access right to what resource for what operation), and with reference to some differentiated technical features and product features of cloud storage authentication, including transferring of a right (e.g., a root account grants a granted cloud resource management right to a sub-account) and authorization of an anonymous account (e.g., public read/write), cloud storage authentication may be completed in a unified policy description manner on a user side. The solution according to an example embodiment can simplify an authorization manner of a current cloud storage authentication system, reduce complexity of system design, facilitate debugging and effect verification, reduce system maintenance costs and use costs of a user, and provide a unified efficient authorization and authentication product and technical solution for a cloud storage service.

With regard to the foregoing method embodiments, for the purpose of simple description, the method embodiments are described as combinations of a series of actions, but a person skilled in the art should understand that the disclosure is not limited by the described order of the actions, as some operations can, in accordance with this application, be performed in other orders or concurrently. Next, a person skilled in the art may also learn that, the example embodiments described in the specification all fall within optional embodiments, and the related actions and modules are not necessarily required in the disclosure.

Based on the example embodiments described above, a person skilled in the art should understand that the methods according to the foregoing embodiments may be implemented by hardware only or by software and a necessary universal hardware platform. However, in most cases, a combination of software and a necessary universal hardware platform may be widely adopted. Based on such an understanding, at least a part of the technical solutions of the example embodiments may be implemented in a form of a software product. The computer software product is stored in a storage medium (such as a RONMRAM, a magnetic disk, or an optical disc) and includes several instructions for instructing a terminal device (which may be a mobile phone, a computer, a server, a network device, or the like) to perform the methods described in the embodiments of this application.

Figure 8:
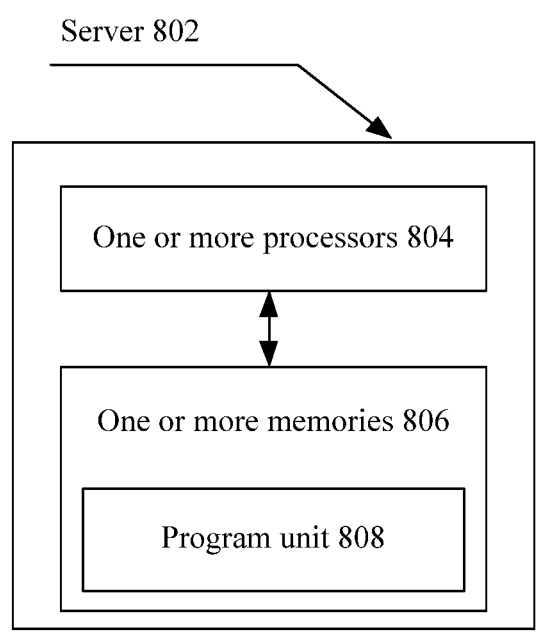
FIG. 8 is a schematic diagram of an optional account authentication server of cloud storage according to an example embodiment.

An example embodiment further provides an account authentication server of cloud storage configured to perform the foregoing account authentication method of cloud storage. FIG. 8 is a schematic diagram of an optional account authentication server 802 of cloud storage according to an example embodiment. As shown in FIG. 8, the account authentication server 802 includes: one or more processors 804 and one or more memories 806 storing program units 808, the program units (or program codes) 808 being executable by the processor 804 to cause the processor 804 to perform the following operations 1-3:

Operation 1: Receive a resource access request of a first client, the resource access request being used by a first account to request for accessing a target resource in a cloud storage system, and the first account logging in to the first client.

The first client is a client for accessing a cloud storage system, and includes, for example but is not limited to, a web client (such as an HTML5 web page), and an application client (such as an installed third party application and a local application of a computer).

The target resource and a resource saved in the cloud storage system in a cloud storage manner include, but are not limited to, user data, documents, and application data. The resources may be saved in forms of a storage bucket and an object. The first account is not an account to which the target resource belongs, but is merely an account of a visitor accessing the target resource, and the resource access request is a request initiated by the first account when the first account requests for access to the target resource.

Operation 2: In response to the resource access request, determine a first access right of the first account according to right configuration information corresponding to the target resource, an association relationship between an account accessing the target resource and an access right of the account being configured in the right configuration information.

In the cloud storage system, a piece of corresponding permission configuration information may be set for each resource, and when a visitor accesses a target resource, a first access right of a first account of the visitor may be determined only according to the permission configuration information of the target resource. The first access right is used to indicate whether the first account is allowed to access the target resource. For example, if the first account is not configured in the right configuration information, or access of the first account is configured to be not allowed, the first access right is used to indicate that the first account is not allowed to access the target resource, and if access of the first account is configured to be allowed in the right configuration information, the first access right is used to indicate that the first account is allowed to access the target resource.

Operation 3: Allow the first account to access the target resource through the first client in a case that the first access right allows the first account to access the target resource.

Compared with the method of the related art technology, an overall setting scheme and an authentication scheme of the technical solution of the disclosure are simple and convenient, and have the following advantages:

(1) There are many portals for right management in the related art technology, including an authentication management system for a cloud service, a policy management system for a storage service, and ACL management. In an example embodiment of the disclosure, for resource granularity-based management, there is only one portal for right management (that is, a portal for configuring right configuration information).

(2) In the related art technology, an authentication procedure is complex, a user-based resource management policy, an ACL policy, and a storage bucket policy need to be comprehensively considered, and there are different execution paths in different context scenarios. In the disclosure, only right configuration information needs to be considered, and an authentication procedure is simple and convenient.

(3) In the related art technology, policy verifiability is poor, and to evaluate whether an operation is effective or why an operation is effective, unified analysis needs to be performed with reference to various scenarios and various policies. However, in an example embodiment of the disclosure, policy verifiability is significantly improved for a cloud storage service that communicates various services involving an authentication policy, because the authentication policy can be verified by only using right configuration information.

Examples and application scenarios implemented by the account authentication server 802 are the same as those of the corresponding operations, but are not limited to the content disclosed by the foregoing embodiment. The foregoing modules can operate as a part of the apparatus in a hardware environment as shown in FIG. 1, and can be implemented by software or hardware or a combination of software and hardware.

Through the account authentication server 802, a resource access request of a first account is received, in response to the resource access request, a first access right of the first account is determined according to right configuration information corresponding to the target resource, an association relationship between an account accessing the target resource and an access right of the account being configured in the right configuration information; and the first account is allowed to access the target resource through the first client in a case that the first access right allows the first account to access the target resource. In the related art technology, there is a technical problem that efficiency of authentication on a visitor who accesses a cloud resource is relatively low. On the other hand, according to an example embodiment, during authentication on the first account, only the right configuration information that is set for the target resource needs to be considered without considering a plurality of authentication policies. Accordingly, an example embodiment can achieve a technical effect of improving efficiency of authentication on a visitor who accesses a cloud resource.

In an optional embodiment of the disclosure, the program units are further executable by the processor to cause the processor to perform the following operations: obtaining an account type of the first account and the right configuration information that is set for the target resource in a plurality of pieces of information; and searching the right configuration information for the first access right according to the account type of the first account.

Optionally, the program units are further executable by the processor to cause the processor to perform the following operations: searching the right configuration information for the first access right corresponding to an account identifier of the first account in a case that the account type of the first account is a root account; searching the right configuration information for an access right corresponding to an account identifier of a root account of the first account as the first access right in a case that the account type of the first account is a sub-account and the root account of the first account allows transferring the access right to the sub-account; and searching the right configuration information for the first access right corresponding to an account identifier of the first account in a case that the account type of the first account is a sub-account.

Optionally, the program units are further configured to perform the following operations: setting, in a case that the account type of the first account is an anonymous account, an access right that is set for the anonymous account in the right configuration information as the first access right.

In another optional embodiment of the disclosure, the program units are further executable by the processor to cause the processor to perform the following operations: detecting a resource operation of the first account on the target resource after the allowing the first account to access the target resource through the first client; and performing the resource operation on the target resource in a case that an operation type of the resource operation is a target type, the target type being a type of an operation that the first account is allowed by the first access right to perform.

Optionally, the program units are further executable by the processor to cause the processor to perform the following operations: receiving a right configuration instruction of a second client before the receiving a resource access request of a first client, the right configuration instruction being used by the second account to configure the first access right of the first account for the target resource, the first access right including a right indicating whether to allow the first account to access the target resource and an operation type of a resource operation that the first account is allowed to perform on the target resource; obtaining, in response to the right configuration instruction, account information of an account to which the target resource belongs; and configuring the first access right corresponding to the right configuration instruction to the first account in a case that the second account matches the account information of the account to which the target resource belongs, and storing an association relationship between the first account allowed to access the target resource and the first access right into right configuration information of the target resource.

The modules or units in an example embodiment may be software modules corresponding to the method operations in the foregoing embodiment, but the disclosure is not limited thereto. Example implementations of the modules are similar to those in the method embodiments. Details are not described herein again.

In the solution provided by an example embodiment, based on the cloud service unified authentication solution in the related art technology (that is, based on a resource management policy of a user, what user has an access right to what resource for what operation), and with reference to some differentiated technical features and product features of cloud storage authentication, including transferring of a right (e.g., a root account grants a granted cloud resource management right to a sub-account) and authorization of an anonymous account (e.g., public read/write), cloud storage authentication may be completed in a unified policy description manner on a user side. The solution can simplify an authorization manner of a current cloud storage authentication system, reduce complexity of system design, facilitate debugging and effect verification, reduce system maintenance costs and use costs of a user, and provide a unified efficient authorization and authentication product and technical solution for a cloud storage service.

Examples and application scenarios implemented by the foregoing modules are the same those of the corresponding operations, but are not limited to the content disclosed by the foregoing embodiment. The foregoing modules can operate as a part of the apparatus in a hardware environment as shown in FIG. 1, and can be implemented through software or hardware or a combination of software and hardware. The hardware environment may include a network environment.

The example embodiments of the disclosure further provide an electronic apparatus configured to perform the foregoing account authentication method of a cloud storage.

Figure 9:
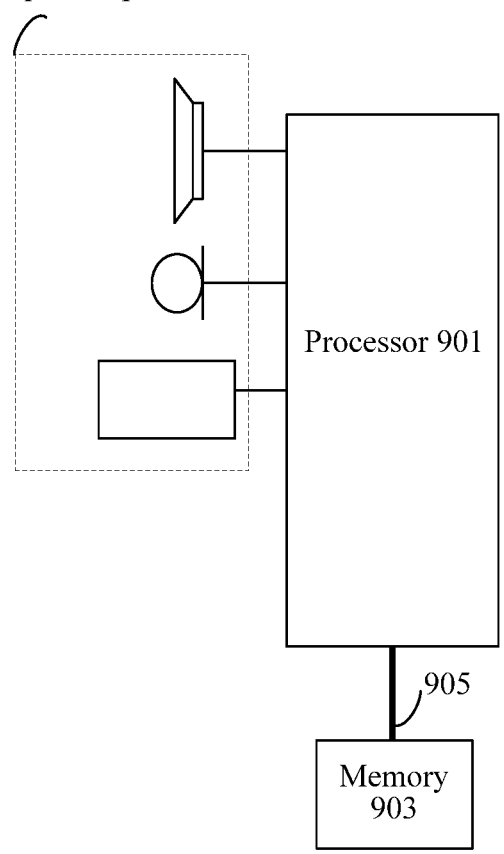
FIG. 9 is a structural block diagram of an electronic apparatus according to an example embodiment.

FIG. 9 is a structural block diagram of an electronic apparatus according to an example embodiment. As shown in FIG. 9, the electronic apparatus may include: one or more processors 901, a memory 903, a transmission apparatus 905, and the electronic apparatus may further include an input/output device 907. While it is described in FIG. 9 that one processor 901 is provided, the processor 901 may include a plurality of processors (that is, two or more processors).

The memory 903 may be configured to store a computer program and a module, for example, a program instruction/module corresponding to the account authentication method and an apparatus of cloud storage in example embodiments of the disclosure, and the processor 901 performs various functional applications and data processing by running a software program and a module stored in the memory 903, that is, implementing the foregoing account authentication method of a cloud storage. The memory 903 may include a high-speed random memory, and may alternatively include a nonvolatile memory such as one or more magnetic storage devices, a flash memory, or another nonvolatile solid-state memory. In some instances, the memory 903 may further include memories remotely disposed relative to the processor 901, and these remote memories may be connected to the terminal through a network. Instances of the network include, but are not limited to, the Internet, an intranet, a local area network, a mobile communications network, and a combination thereof.

The transmission apparatus 905 is configured to receive or transmit data through a network or may be configured for data transmission between the processor 901 and the memory 903. Specific instances of the network may include a wired network and a wireless network. In an example, the transmission apparatus 905 includes a network interface controller (NIC) that may be connected to another network device and a router by using a network cable, so as to communicate with the Internet or a local area network. In an example, the transmission apparatus 905 is a radio frequency (RF) module that is configured to communicate with the Internet in a wireless manner.

Specifically, the memory 903 is configured to store an application program.

The processor 901 may invoke, by using the transmission apparatus 905, the application stored in the memory 903, so as to execute the following operations: receiving a resource access request of a first client, the resource access request being used by a first account to request for accessing a target resource in a cloud storage system, and the first account logging in to the first client; determining, in response to the resource access request, a first access right of the first account according to right configuration information corresponding to the target resource, an association relationship between an account accessing the target resource and an access right of the account being configured in the right configuration information; and allowing the first account to access the target resource through the first client in a case that the first access right allows the first account to access the target resource.

The processor 901 is further configured to perform the following operations: searching the right configuration information for the first access right corresponding to an account identifier of the first account in a case that the account type of the first account is a root account; searching the right configuration information for an access right corresponding to an account identifier of a root account of the first account as the first access right in a case that the account type of the first account is a sub-account and the root account of the first account allows transferring the access right to the sub-account; and searching the right configuration information for the first access right corresponding to an account identifier of the first account in a case that the account type of the first account is a sub-account;

In the example embodiments, a resource access request of a first client is received, the resource access request being used by a first account to request for accessing a target resource in a cloud storage system, and the first account logging in to the first client; in response to the resource access request, a first access right of the first account is determined according to right configuration information corresponding to the target resource, an association relationship between an account accessing the target resource and an access right of the account being configured in the right configuration information; and allowing the first account to access the target resource through the first client in a case that the first access right allows the first account to access the target resource. During authentication on the first account, only the right configuration information that is set for the target resource needs to be considered without considering a plurality of authentication policies. Accordingly, the technical problem in the related art technology that efficiency of authentication on a visitor who accesses a cloud resource is low can be solved. Also, a technical effect of improving efficiency of authentication on a visitor who accesses a cloud resource can be achieved.

Optionally, for a specific example in an example embodiment, the examples described in the foregoing embodiments may be referred to, and details are not described herein again in an example embodiment.

A person of ordinary skill in the art should understand that, the structure shown in FIG. 9 is only illustrative and thus not limiting. The electronic apparatus may be a terminal device such as a smartphone (such as an Android mobile phone or an iOS mobile phone), a tablet computer, a palmtop computer, a mobile Internet device (MID), or a PAD. FIG. 9 does not limit the structure of the electronic apparatus according to an example embodiment. For example, the electronic apparatus may alternatively include more or less components (such as a network interface and a display apparatus) than those shown in FIG. 9, or has a configuration different from that shown in FIG. 9.

A person of ordinary skill in the art should understand that all or a part of the operations of the methods of the foregoing embodiments may be implemented by a program instructing relevant hardware of the terminal device. The program may be stored in a computer readable storage medium. The storage medium may be a flash disk, a read-only memory (ROM), a random access memory (RAM), a magnetic disk, or an optical disc.

An example embodiment further provides a storage medium. Optionally, in an example embodiment, the storage medium stores a computer program, the computer program configured to perform, when running, the account authentication method of cloud storage.

Optionally, in an example embodiment, the foregoing storage medium may be located in at least one of a plurality of network devices in the network shown in the foregoing embodiment.

Optionally, in an example embodiment, the storage medium is set to store program code used for performing the following operations:

S11: Receive a resource access request of a first client, the resource access request being used by a first account to request for accessing a target resource in a cloud storage system, and the first account logging in to the first client.

S12: Determine, in response to the resource access request, a first access right of the first account according to right configuration information corresponding to the target resource, an association relationship between an account accessing the target resource and an access right of the account being configured in the right configuration information.

S13: Allow the first account to access the target resource through the first client in a case that the first access right allows the first account to access the target resource.

Optionally, the storage medium is further configured to store program code used to execute the following operations:

S21: Search the right configuration information for the first access right corresponding to an account identifier of the first account in a case that the account type of the first account is a root account.

S22: Search the right configuration information for an access right corresponding to an account identifier of a root account of the first account as the first access right in a case that the account type of the first account is a sub-account and the root account of the first account allows transferring the access right to the sub-account.

S23: Search the right configuration information for the first access right corresponding to an account identifier of the first account in a case that the account type of the first account is a sub-account.

Optionally, for a specific example in an example embodiment, refer to the examples described in the foregoing embodiments, and details are not described herein again in an example embodiment.

Optionally, in an example embodiment, the foregoing storage medium may include, for example but is not limited to: any medium that can store program code, such as a USB flash drive, a read-only memory (ROM), a random access memory (RAM), a removable hard disk, a magnetic disk, or an optical disc.

The sequence numbers of the preceding embodiments of the disclosure are merely for description purpose but do not indicate the preference of the embodiments.

In a case that the integrated unit in the foregoing embodiment is implemented in a form of a software functional module and sold or used as an independent product, the integrated unit may be stored in the foregoing computer-readable storage medium. Based on such an understanding, at least a part of the technical solutions of the embodiments may be implemented in a form of a software product. The computer software product is stored in a storage medium and includes instructions for instructing one or more computer devices (which may be a personal computer, a server, a network device, or the like) to perform all or some of the operations of the methods described in the embodiments of the disclosure.

In the foregoing embodiments of the disclosure, descriptions of the embodiments have different emphases, and as for parts that are not described in detail in one embodiment, reference can be made to the relevant description of the other embodiments.

In the example embodiments of the disclosure, it is to be understood that the disclosed client may be implemented in other manners. The described apparatus embodiments are merely exemplary. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electronic or other forms.

The units described as separate parts may or may not be physically separate, and the parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the disclosure may be integrated into one processing unit, or each of the units may exist alone physically, or two or more units may be integrated into one unit. The integrated unit may be implemented in a form of hardware, or may be implemented in a form of a software functional unit.

In the example embodiments of the disclosure, during authentication on the first account, only the right configuration information that is set for the target resource needs to be considered without considering a plurality of authentication policies, so that the technical problem that efficiency of authentication on a visitor who accesses a cloud resource is low in the related art technology can be solved and a technical effect of improving efficiency of authentication on a visitor who accesses a cloud resource can be achieved.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, wtich contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing steps may employ any number of related art techniques for electronics configuration, signal processing and/or control, data processing and the like.

While a few example embodiments have been described above, the scope of the disclosure is not limited thereto and various modifications and improvements made by those of ordinary skill in the art to concepts defined in the following claims should be understood to fall within the scope of the disclosure.

What is claimed is:

1. A method of authenticating an account, the method comprising:

receiving, by a server from a first client, a resource access request requesting for accessing, by a first account, a target resource in a cloud storage system, the first account logging in to the first client;
determining, by the server in response to the resource access request, a first access right of the first account based on right configuration information corresponding to the target resource, the right configuration information indicating an association relationship between an account and an access right of the account to the target resource; and
allowing, by the server, the first account to access the target resource through the first client based on the first access right indicating that the first account is allowed to access the target resource,
wherein the determining comprises:
collecting policies related to the first account, the policies including a user-based resource management policy, an access control list (ACL) policy, and a storage bucket policy; and
based on a determination that there are a resource and an operation that are both authorized policies among the collected policies, performing the followings:
determining whether a root account of the first account has the access right; and
based on a determination that the root account of the first account does not have the access right, determining whether an anonymous identity of the first account has an access right to the target resource; and
determining the first access right of the first account based on a determination that the anonymous identity of the first account has the access right to the target resource.

2. The method according to claim 1, wherein the determining the first access right of the first account comprises:
obtaining, by the server, an account type of the first account and the right configuration information corresponding to the target resource; and
searching, by the server, the right configuration information for the first access right according to the account type of the first account.

3. The method according to claim 2, wherein the searching comprises at least one of:
searching, by the server, the right configuration information for the first access right corresponding to an account identifier of the first account based on the account type of the first account being a root account;
searching, by the server, the right configuration information for the access right corresponding to an account identifier of a-the root account of the first account as the first access right based on the account type of the first account being a sub-account and the root account of the first account allowing transferring the access right to the sub-account; or
searching, by the server, the right configuration information for the first access right corresponding to the account identifier of the first account based on the account type of the first account being the sub-account.

4. The method according to claim 2, wherein the searching comprises:
setting, by the server for the first account of which the account type is an anonymous account, an access right corresponding to the anonymous account in the right configuration information as the first access right.

5. The method according to claim 1, further comprising:
detecting, by the server, a resource operation of the first account on the target resource; and performing, by the server, the resource operation on the target resource based on an operation type of the resource operation being a type of an operation that the first account is allowed by the first access right to perform.

6. The method according to claim 1, further comprising:
receiving, by the server, a right configuration instruction of a second client, the first access right of the first account for the target resource being configured based on the right configuration instruction through a second account, the first access right comprising a right indicating whether to allow the first account to access the target resource and an operation type of a resource operation that the first account is allowed to perform on the target resource;
obtaining, by the server in response to the right configuration instruction, account information of an account to which the target resource belongs; and
configuring, by the server, the first access right of the first account corresponding to the right configuration instruction based on the second account being the account to which the target resource belongs, and storing an association relationship between the first account allowed to access the target resource and the first access right into the right configuration information corresponding to the target resource.

7. An electronic apparatus, comprising at least one memory, at least one processor, and computer program stored on the at least one memory and executable by the at least one processor, to cause the at least one processor to perform the method according to claim 1.

8. A server for authenticating an account, the server comprising:
at least one memory operable to store program code; and
at least one processor operable to read the program code and operate as instructed by the program code, the program code comprising:
receiving code configured to cause at least one of the at least one processor to receive, from a first client, a resource access request requesting for accessing, by a first account, a target resource in a cloud storage system, the first account logging in to the first client;
determining code configured to cause at least one of the at least one processor to determine, in response to the resource access request, a first access right of the first account based on right configuration information corresponding to the target resource, the right configuration information indicating an association relationship between an account and an access right of the account to the target resource; and
allowing code configured to cause at least one of the at least one processor to allow the first account to access the target resource through the first client based on the first access right indicating that the first account is allowed to access the target resource,
wherein the determining code is configured to cause at least one of the at least one processor to:
collect policies related to the first account, the policies including a user-based resource management policy, an access control list (ACL) policy, and a storage bucket policy; and
based on a determination that there are a resource and an operation that are both authorized policies among the collected policies, perform the followings:
determining whether a root account of the first account has the access right; and based on a determination that the root account of the first account does not have the access right, determining whether an anonymous identity of the first account has an access right to the target resource; and determining the first access right of the first account based on a determination that the anonymous identity of the first account has the access right to the target resource.

9. The server according to claim 8, wherein the program code further comprises:

obtaining code configured to cause at least one of the at least one processor to obtain an account type of the first account and the right configuration information; and searching code configured to cause at least one of the at least one processor to search the right configuration information for the first access right according to the account type of the first account.

10. The server according to claim 9, wherein the searching code further causes at least one of the at least one processor to perform at least one of:

searching the right configuration information for the first access right corresponding to an account identifier of the first account based on the account type of the first account being a root account;

searching the right configuration information for the access right corresponding to an account identifier of the root account of the first account as the first access right based on the account type of the first account being a sub-account and the root account of the first account allowing transferring the access right to the sub-account; or searching the right configuration information for the first access right corresponding to the account identifier of the first account based on the account type of the first account being the sub-account.

11. The server according to claim 9, wherein the program code further comprises:

setting code configured to cause at least one of the at least one processor to set, for the first account of which the account type is an anonymous account, an access right corresponding to the anonymous account in the right configuration information as the first access right.

12. The server according to claim 8, wherein the program code further comprises:

code configured to cause at least one of the at least one processor to detect a resource operation of the first account on the target resource after the allowing the first account to access the target resource through the first client; and code configured to cause at least one of the at least one processor to perform the resource operation on the target resource based on an operation type of the resource operation being a type of an operation that the first account is allowed by the first access right to perform.

13. The server according to claim 8, wherein code further comprises:

code configured to cause at least one of the at least one processor to receive a right configuration instruction of a second client, the first access right of the first account for the target resource being configured based on the right configuration instruction through a second account, the first access right comprising a right indicating whether to allow the first account to access the target resource and an operation type of a resource operation that the first account is allowed to perform on the target resource;

code configured to cause at least one of the at least one processor to obtain, in response to the right configuration instruction, account information of an account to which the target resource belongs; and code configured to cause at least one of the at least one processor to configure the first access right of the first account corresponding to the right configuration instruction based on the second account being the account to which the target resource belongs, and storing an association relationship between the first account allowed to access the target resource and the first access right into the right configuration information corresponding to the target resource.

14. A non-transitory storage medium, storing computer program, which, when executed by at least one processor, causes at least one of the at least one processor to perform a method of authenticating an account, the method comprising:

receiving, from a first client, a resource access request requesting for accessing, by a first account, a target resource in a cloud storage system, the first account logging in to the first client;

determining, in response to the resource access request, a first access right of the first account based on right configuration information corresponding to the target resource, the right configuration information indicating an association relationship between an account and an access right of the account to the target resource; and allowing the first account to access the target resource through the first client based on the first access right indicating that the first account is allowed to access the target resource, wherein the determining comprises:

collecting policies related to the first account, the policies including a user-based resource management policy, an access control list (ACL) policy, and a storage bucket policy; and based on a determination that there are a resource and an operation that are both authorized policies among the collected policies, performing the followings:

determining whether a root account of the first account has the access right; and based on a determination that the root account of the first account does not have the access right, determining whether an anonymous identity of the first account has an access right to the target resource; and determining the first access right of the first account based on a determination that the anonymous identity of the first account has the access right to the target resource.

15. The storage medium according to claim 14 wherein the determining comprises:

obtaining an account type of the first account and the right configuration information corresponding to the target resource; and searching the right configuration information for the first access right according to the account type of the first account.

16. The storage medium according to claim 15, wherein the searching comprises at least one of:

searching the right configuration information for the first access right corresponding to an account identifier of the first account based on the account type of the first account being a root account;

searching the right configuration information for the access right corresponding to an account identifier of the root account of the first account as the first access right based on the account type of the first account being a sub-account and the root account of the first account allowing transferring the access right to the sub-account; or searching the right configuration information for the first access right corresponding to the account identifier of the first account based on the account type of the first account being the sub-account.

17. The storage medium according to claim 15, wherein the searching comprises:
    setting, for the first account of which the account type is an anonymous account, an access right corresponding to the anonymous account in the right configuration information as the first access right.

18. The storage medium according to claim 14, wherein the method further comprises:
    detecting a resource operation of the first account on the target resource; and
    performing the resource operation on the target resource based on an operation type of the resource operation being a type of an operation that the first account is allowed by the first access right to perform.

19. The storage medium according to claim 14, wherein the method further comprises:
    receiving a right configuration instruction of a second client, the first access right of the first account for the target resource being configured based on the right configuration instruction through a second account, the first access right comprising a right indicating whether to allow the first account to access the target resource and an operation type of a resource operation that the first account is allowed to perform on the target resource;
    obtaining, in response to the right configuration instruction, account information of an account to which the target resource belongs; and
    configuring the first access right of the first account corresponding to the right configuration instruction based on the second account being the account to which the target resource belongs, and storing an association relationship between the first account allowed to access the target resource and the first access right into the right configuration information corresponding to the target resource.

\* \* \* \* \*